May 9, 1967     G. W. BANKS     3,318,577
HIGH PRESSURE VALVE HAVING SOFT SEATING AND BALANCED SEAL
Filed May 24, 1965     3 Sheets-Sheet 1
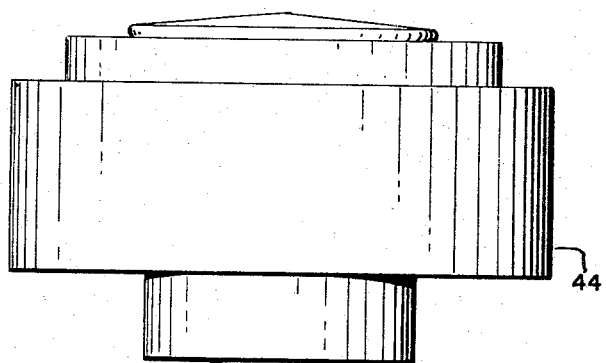
FIG. 1
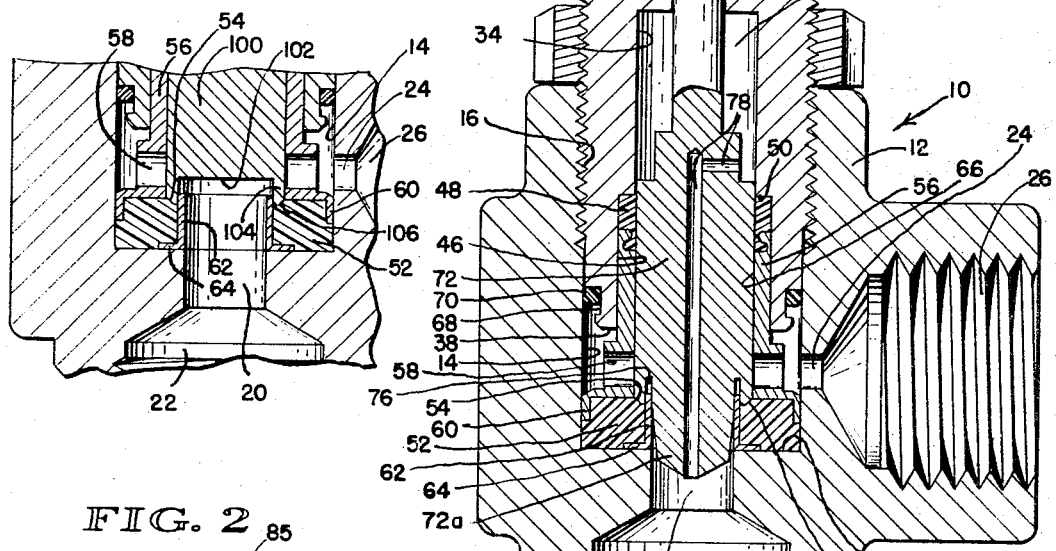
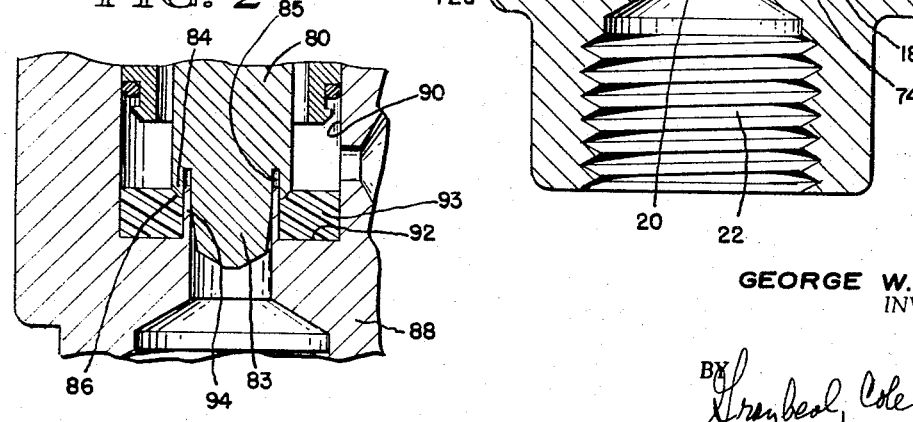
FIG. 3
FIG. 2
GEORGE W. BANKS
INVENTOR.
ATTORNEYS May 9, 1967 G. W. BANKS 3,318,577
HIGH PRESSURE VALVE HAVING SOFT SEATING AND BALANCED SEAL
Filed May 24, 1965 3 Sheets-Sheet 2

GEORGE W. BANKS
INVENTOR.

ATTORNEYS

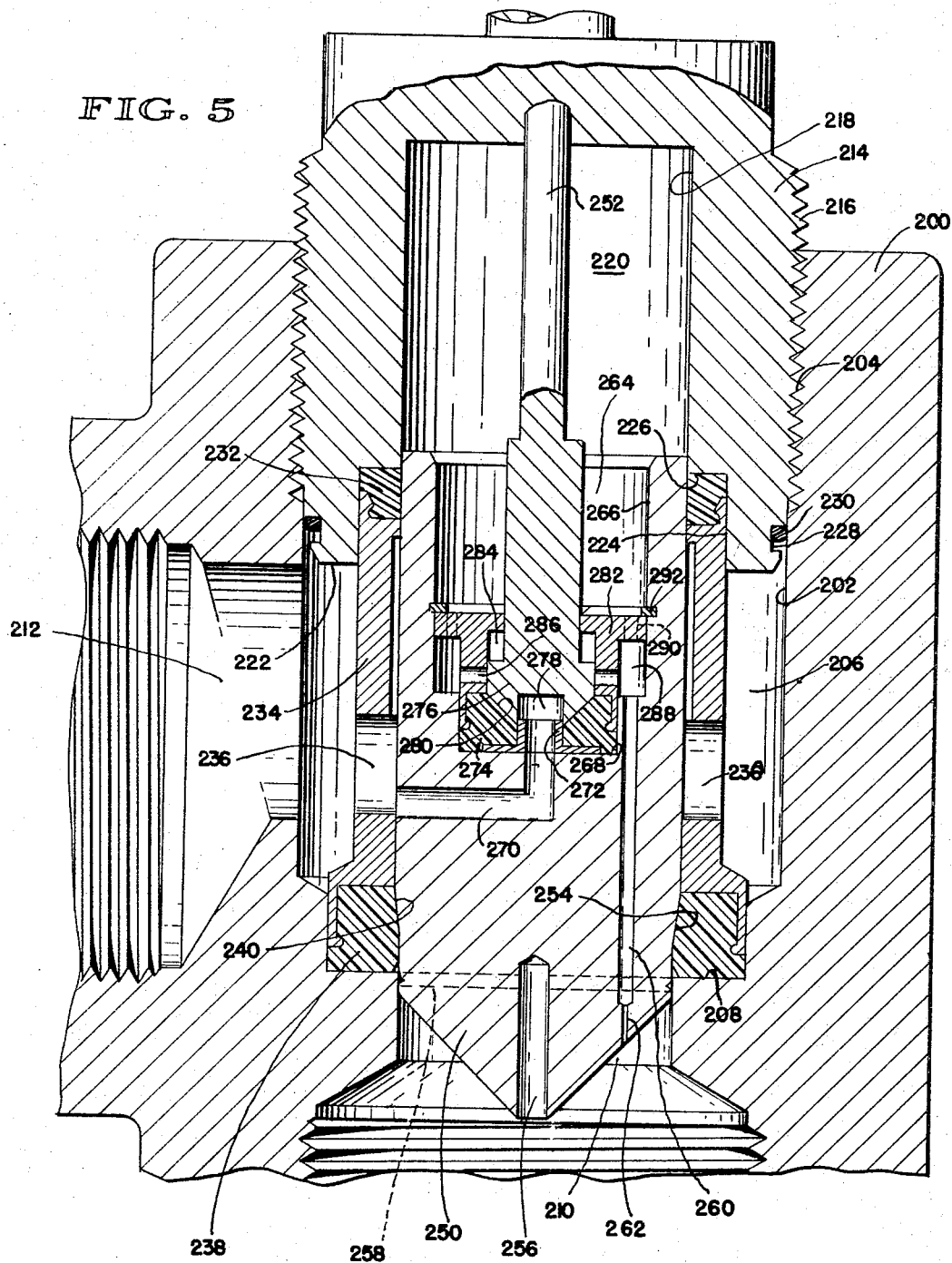

_United States Patent Office_

3,318,577
Patented May 9, 1967

3,318,577
HIGH PRESSURE VALVE HAVING SOFT SEATING
AND BALANCED SEAL
George W. Banks, 24824 43rd Ave. S.,
Kent, Wash. 98031
Filed May 24, 1965, Ser. No. 457,939
11 Claims. (Cl. 251—332)

This application is a continuation-in-part of applicant's copending application Ser. No. 146,854, filed Oct. 23, 1961, and entitled, "High Pressure Balanced Positive Seal Control Valve," now abandoned.

This invention relates to improvements in high pressure, minute metering "soft seat" valves. More particularly does this invention relate to high pressure metering valves which employ new and novel design principles which give positive, leak-proof shutoff and opening, and which at the same time, allow for precise metering regardless of high fluid pressures and velocities, and regardless of the direction of flow of the fluid.

Numerous problems arise in the highly complex art of high pressure, soft seat, metering valves. Among these are distortion and erosion of the soft seat due to the high working pressures and velocities of the fluids, and improper sealing and erratic opening and closing characteristics of the working parts. Another primary source of trouble is lack of control of the plastic or "soft" seat itself. Where differential pressure across the valve is high, flow control of the high pressure fluid may be so defective that the valve has little or no metering capability and hence, only serves to open or close a line flow, rather than precisely meter such flow. Operation can be so unpredictable in many valves that not only may the valve be functionally inadequate, but the valve can be dangerous to the operation of equipment attached to the pressure lines. Those skilled in the art are also well aware of the problems caused by imperfect sealing in high pressure metering valves. The problem would appear to be the use of seals which are at once economically feasible and yet which exert sufficient pressures on the working parts to prevent leakage.

Accordingly, two important features are herein presented which contribute to the overcoming of the above problems. To the disadvantages arising from high differential pressures and reverse flows, is directed a new and novel concept in an "inverted cup" type closure member, at the lower end of the closure element, which caps or coacts in combination with what may be termed a deflection or by-pass tube. The valve's soft seat is situated at the lower end of the valve bore with the by-pass extending upwardly around the inner surface of the seat which defines the opening in the seat. At the same time, the lower end or rim of the closure member is designed to be lowered over the outside of the by-pass and to engage the soft seat. The other feature is one by which forces against the seat are transferred to a balance seal member. The closure member engages the soft seat at the bottom of the valve bore. Contact pressures with the seat are transferred through a pressure transmission or characterization ring surrounding the closure member to the balance seal at the upper end of the closure member. Those skilled in the art will appreciate that a hydraulic principle of transmitting forces through flowable pressure transferring media in the form of the seat and the seal is involved.

The features of the instant valve are intended to broaden the usefulness of high pressure metering valves by making them more efficient in their control of either high or low pressure fluids. The principles of this invention also make the production of such valves more economical and easier to maintain. Most prior art vlaves require adjustment by an expert before they are useable. The only adjustment necessary in the instant invention is the torquing of the barrel assembly into the body at the time the valve is prepared for operation. In the instant valve structure, the closure member is an inverted cup and the plastic or Teflon seat is fashioned with a metal by-pass tube through its center. The combination of the by-pass and the inverted cup causes the working pressure, regardless of the direction of flow, to always tend to hold the seat down in its proper place. Thus, the valve operates equally well with the flow in either direction.

A number of other features and advantages are inherent in the present invention. The valve has a very low operating torque and force from the control knob which places squeeze on the seat also is transferred to the balance seal at the upper end of the closure member. The valve's flow control is so efficient that regardless of orifice size or working pressures, it may be used for a sampling valve. Control also is so reliable and precise that a water manometer may be safely regulated when connected to a 6,000 p.s.i. main. All of the moving or wearing parts are contained in the spindle barrel assembly. All parts of the valve are interchangeable and no assembly adjustments are necessary The balance seal operates on a straight sided cylindrical closure member, in contradistinction to hithertofore known valves, and gives the valve a low operating torque with a smooth line flow curve. Another unique and important feature of this invention is its multiple stage opening and closing characteristics. In high pressure metering valves differential pressures across the closure members and seats are substantial. When a valve is being opened or closed, the plastic seat is subjected to extremely high fluid velocities and pressures and the tendency is to erode the seat and displace it if not properly confined. In the instant invention the deflection or by-pass tube may be employed with a cup-like closure member. However, flow metering or control is normally desired and therefore a metering pin may be incorporated at the lower end of the closure member as in many high pressure valves. The metering pin will actually contact the by-pass tube to give metal-to-metal contact and finally shut off the valve. In like manner the closure member in conjunction with the characterization ring ports will give the final shut off if fluid flow is in the opposite direction. The seat therefore provides the positive leak prook shut off in what may be termed a multiple stage closing valve. The seat is not the primary closing element. In the instant invention, the ports in the characterization ring and both the inner and outer surfaces of the by-pass protect the soft seat by, in effect, imparting metal metering to the fluids before the fluid passes over the seat. In short, it may be said that the by-pass and the ports in the characterization ring dissipate a good deal of the energy of the high velocity fluid before the fluid encounters the seat.

These and other objects, advantages and features will become apparent in the details of construction and operation as more fully hereinafter described and claimed. Reference will be had to the accompanying drawings wherein like numerals will refer to like parts throughout, and in which:

FIGURE 1 is a cross-sectional view of a valve in which the combined features of a by-pass tube and inverted cup structure are joined with a balance seal on the closure member;

FIGURE 2 is a partial view in cross-section showing that the by-pass tube for coacting with the inverted cup closure member may be integrally formed from the body of the valve;

FIGURE 3 is another partial cross-sectional view essentially of the same parts as shown in FIGURE 1, except that the metering pin portion of the closure member has been eliminated;

FIGURE 5 is a cross-sectional view of a form of balanced pressure valve employing a pilot valve structure therein.

Figure 4:
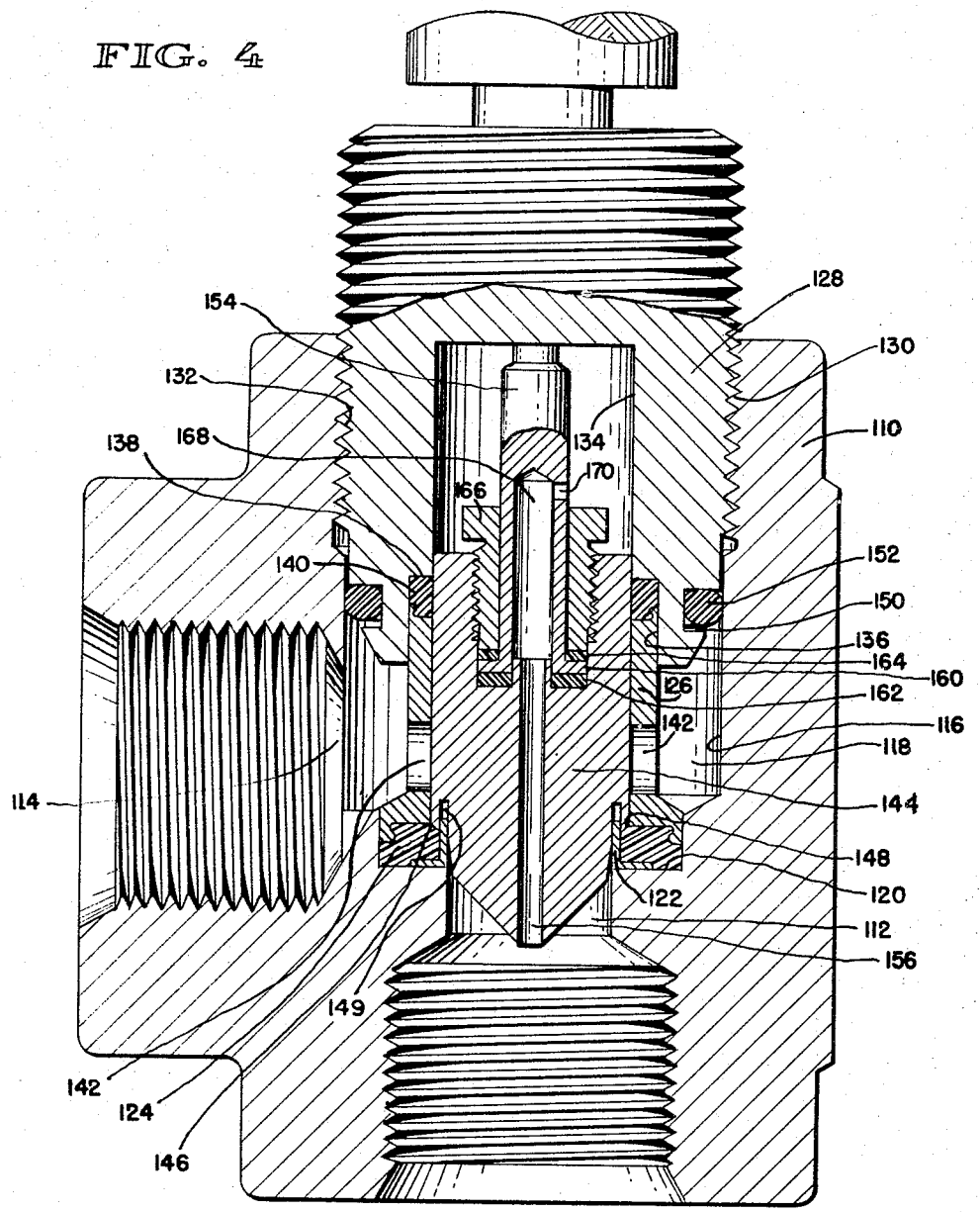
FIGURE 4 is a cross-sectional view of another form of valve in which the operating stem swivels with respect to the closure member to reduce the torque required in opening and closing the valve.

Referring now to the drawings, and more particularly to FIGURE 1, it will be seen that the valve, generally referred to by the number 10, has a body 12 in which the valve parts are installed. A central valve opening is defined by wall 14 in the body and the upper portion thereof is threaded as at 16. Thus, a straight drill with thread tapping operation only is involved in forming the main opening for the valve parts. The lower end of opening 14 constitutes a seat receiving bottom surface 18. As is conventional in valve structure, a first orifice or bore 20 opens into the valve opening or chamber defined by wall or surface 14 through the bottom surface 18. Orifice or bore 20 has a threaded line connection 22. In like manner, a second orifice 24 opens into the valve chamber above the seat surface 18 and it has threaded line connection opening 26. A spindle barrel structure, generally designated by the number 28, has a cylindrical lower portion 30 which is threaded on the outside thereof as at 32, to be received by threads 16 of body 12. The barrel structure is generally closed at its upper end and is open at the lower end thereof. As the lower portion 30 is generally cylindrical, the walls thereof are thick with the inner surface 34 defining a closure cavity 36. The lower end 38 of the spindle barrel terminates above intersecting orifice or bore 24. Spindle barrel 28 permits an operating stem 40 to extend upwardly therethrough through an upper barrel portion 42. The upper portions of the barrel structure, as well as structure attached at the upper end of the stem 40 are not essential to an understanding of this invention. The operating handle 44 is responsible for moving stem 40 which, in turn, moves the closure member to be described more fully hereinafter.

It will be seen that the lower portion of inner surface 34 of the barrel has a radially outwardly offset surface 46. At the upper end of the offset surface area 46 is a balance seal 48 which is generally also cylindrical or ring-shaped to be accommodated by the abutment wall 50 at the upper end of said offset surface 46. The inner surface of balance seal 48 coincides generally with the diameter of inner barrel wall surface 34. On the bottom or seat surface 18 is a plastic seat 52 such as Teflon or the like for engaging the closure member. Seat 52 has a central opening therethrough and a beveled or tapered closure surface 54 on the upper inside surface thereof. A metal characterization ring 56 is shaped at its upper end so as to detachably engage balance seal 48. The characterization ring 56 transmits contact pressure from seat 52 to the seal 48 and has ports 58 to permit unobstructed communication between the closure chamber and the intersecting orifice or bore 24. The characterization ring 56 also embodies a skirt, depending annular wall or other structure 60 for detachably engaging seat 52 above bottom surface 18. The seat 52 extends from the outside diameter of by-pass 62 to wall 14. An upstanding by-pass tube 62 extends upwardly from seat surface 18 to a point slightly above the top surface of seat 52. By-pass 62 has an inner diameter which is generally coincident with orifice or bore 20, and is of sufficient thickness to withstand high pressure, high velocity fluids. The by-pass 62 may be either separately formed as shown in FIGURE 1 in the form of a shallow cylinder with an outstanding rest or foot portion 64, or it may be integrally formed from the body of the valve as shown in FIGURE 2. If the by-pass 62 is formed separately of the body, and inserted with the seat, an otherwise expensive machining operation in forming the by-pass from the body is eliminated. As can be seen, the inner surface 66 of characterization ring 56 is also generally coincident with the diameters of seal 48 and inner barrel surface 34. An annular groove 68 around the outside lower portion of barrel 30 is formed to receive a Teflon O-ring 70 for properly sealing the barrel with respect to the body. Pressure from the fluids moving through the valve, regardless of direction, tend to force the O-ring upwardly and thereby seal the barrel to the body.

As can be seen by-pass 62 could be incorporated in the valve in numerous design variations. The principal purpose of this important element is to furnish means for directing high pressure fluid to the upper side of the seat. In order to avoid erosion and deformation of the seat, it is desirable that such by-pass convey fluid to a level above the lowermost point on the upper surface of said seat. The diameter of the by-pass need not be coincident with the diameter of the bottom orifice or port 20. This feature embraces by-pass structures which are both larger and smaller in diameter. By-pass 62 in no way acts as a stop for the closure member, but in fact is spaced from the bottom of the closure member, when said closure member is in its closed position.

At the lower end of stem 40 is an elongated generally cylindrical closure member 72. Closure member 72 is long enough so that it reaches or extends from the area of seat 52 into the closure chamber 36 above moving seal 48. Closure member 72 has a tapered surface 74 near the lower end thereof for engaging the beveled surface 54 on seat 52. The tapered surface 74 of the closure member extends below the upper edge or rim of by-pass 62 in order to engage the bevel surface 54 of seat 52. It will be understood that the seat surface 54 and cup engaging surface 74 need not be beveled as shown, but can be perfectly flat. It has been found, however, that some bevel is preferable. It is necessary to provide a cavity in the nature of a recessed area or an annular groove 76 in the closure member in order to accommodate the by-pass 62. By-pass does not contact the lower end of closure member 72, but rather is in spaced non-contact relation to the deepest point of the cavity or lower end of said closure member. Thus, the by-pass does not obstruct travel of the closure member and the seat itself acts as the sole stop for the closure member. It will be noticed that in FIGURE 1 closure member 72 has a metering pin portion 72a which extends downwardly from the central area of the closure member, into the by-pass and into the orifice or bore 20. Metering pin 72a is a well-known feature, and does not alter the inverted cup and by-pass principle of this invention. It will be appreciated that a metering pin portion 78 on the closure member will be desirable in most cases. By-pass 62 while essentially rigid is capable of some flexing when contacted by the metering pin portion 72a. Thus, there is in effect metal-to-metal shut off of the valve with the seat contacting surface 74 engaging seat 52 to give final and positive leak proof closing which the metal-to-metal contact cannot provide. Such feature contributes significantly to the excellent performance of the invention. Closure member 72 can be seen to have a central pressure balancing duct 78 leading from the lower end thereof to the chamber area 36 above the closure member.

FIGURE 2 shows a closure member 80 with annular closure wall 84 having a lower rim or edge with contact surface 86. Hence it will be seen that the valve need not be of the balanced pressure type or that it need have the balance seal and characterization ring. The valve of FIGURE 2 has a metering pin portion 83 which together with closure wall 84 defines the annular cavity 85. Seat 93 is received and supported on seat surface 92 between the outer diameter of by-pass 94 and surface 90. FIGURE 2 further shows that body 88 has central valve opening surface 90, bottom seat receiving surface 92, and by-pass 94 formed integrally from said body. It is intended that the inverted cup principle as shown in all figures may be used in valves other than balance type, as suggested in FIGURES 2 and 3. In FIGURE 3, closure member 100 has also had its metering pin removed so that a straight recessed surface 102 is formed to define a cavity for receiving the by-pass. Closure member 100 of FIGURE 3 can, as in FIGURE 2, be seen to have a depending annular closure wall 104 with seat engaging surface 106 thereon for engaging beveled surface 54. Again, it will be noticed that the closure member 100 does not have a pressure balancing duct to illustrate an alternative form of the by-pass and inverted cup principle.

FIGURE 4 illustrates another form of valve structure. Body 110 has lower coaxial orifice or bore 112 and intersecting orifice or bore 114. A body wall 116 defines central valve cavity 118 with bottom seat receiving surface 120. A separate stand or by-pass 122 is provided therein with an annular or ring-shaped seat 124 shown in its proper position. Characterization pressure transmission ring 126 is shown to be form-fitted at the lower end thereof in order to engage plastic seat 124 around the outside portion thereof. A barrel 128 has threaded portion 130 to be received in threads 132 at the upper portion of surface 116. The inside of barrel 128 has closure chamber defining wall 134 and offset surface 136 with abutment surface 138. A balance seal 140 is provided at the upper end of offset surface 136 and, as can be seen, is form-fitted to be received on the upper end of the pressure transmission or characterization ring 126. Characterization ring 126 has ports 142 generally communicating with the intersecting orifice or bore 114. Again, as in the previous embodiments, the inner surfaces of balance seal 140, characterization ring 126, and closure chamber wall 134 are generally coincident to accommodate closure member 144. Closure member 144 has lower tapered seat engaging surface 146 with cavity 149, said engaging surface 146 for engaging or contacting bevel surface 148 on the seat and said cavity 149 for receiving by-pass 122. The lower outer surface of barrel 128 is provided with an annular groove 150 for receiving the Teflon O-ring 152.

Closure member 144 in FIGURE 4 takes a slightly different shape from that shown in FIGURE 1, in that stem 154 is detachably connected to the closure member 144. Pressure balancing duct 156 extends through the closure member from the lower end to the upper side thereof and illustrates an arrangement that would be employed in larger high pressure valves where operating torques are substantial. Lower end of stem 154 has an outstanding flange 160 which extends into a recessed area on the upper end of the closure member. A bearing member 162 is provided below the flange and a bearing member 164 is provided above the flange. A retaining nut 166 threads into the opening holding both bearings 162 and 164 in place with respect to flange 160 of the stem. The lower end of stem 154 is hollow through its lower portion as at 168 to allow fluid passing from pressure balancing duct 156 to reach the closure chamber above closure member 144 through a port 170.

FIGURE 5 illustrates use of the principles of this invention in an even different valve structure. Body 200 has central valve cavity defining wall 202, the upper portion of which is threaded as at 204. Wall 202 defines central valve opening or chamber 206, which valve chamber has lower or bottom seat-receiving surface 208. Body 290 has a lower or first orifice or bore 210 which leads into the central valve opening through said bottom seat surface 208 generally coaxially therewith. In like manner, intersecting orifice or bore 212 opens or communicates into the central valve cavity 206 above seat or bottom surface 208. Cylindrical barrel 214 is threaded around its outside to be received in the body with threads 216, while its inner surface 218 defines closure chamber 220. The barrel, as will be appreciated, is closed at the top and open at the bottom with the lower end 222 terminating in line with or generally above the uppermost point of intersecting bore or orifice 212. Barrel 214 has offset surface 224 formed radially outwardly on the inner surface at the lower end of said inner surface. Formation of said offset surface 224 provides abutment surface 226 at the upper end of said offset surface. As in other embodiments, an annular groove is provided around the lower outside end of the barrel 228 to accommodate Teflon O-ring seal 230. Offset surface 224 and abutment surface 226 receive a ring-type or cylindrical plastic seal member 232 the inner edge of which is generally coincident with inner closure chamber surface 218 of the barrel. A characterization ring 234 is form-fitted on its upper end to seal 232, has ports 236 spaced radially therearound in communication with intersecting orifice 212, and at its lower end is form-fitted to the upper portion of plastic seat 238 supported on bottom surface 208. In the embodiment shown in FIGURE 5, the by-pass has been omitted and the inner surface of seat 238 tapered or beveled as at 240 for coaction with a tapered portion on the closure member to be described more fully hereinafter. The principle of transmitting pressures applied to the seat through the pressure transmission or characterization ring to the balance seal at the upper end of the closure member is also illustrated in this particular embodiment. Thus it can be appreciated that the balance seal principle is as applicable to valves not employing the by-pass and inverted cup as it is to valves which do.

The closure member itself is, as in other embodiments, an elongated, cylindrically-shaped piston-like member 250. Closure member 250 extends in its closed position from a point slightly above balance seal 232 to a fully seated position on seat 238. Closure member 250 is moved upwardly and downwardly by stem 252 in a manner similar to movement of the closure member in FIGURE 4. The particular embodiment in FIGURE 5 is a balanced pressure valve employing a pilot valve in conjunction with the closure member. The lower end of the closure member is provided with a tapered surface 254 which engages the tapered or beveled surface 240 of seat 238. The extreme lower end of the closure member forming a metering valve portion, has a central passage 256 which supplies fluid to a series of radially extending ducts or passageways 258. Ducts 258 enable more efficient opening and closing of the valve. For instance, when the valve is to be opened from the position shown in FIGURE 5, there is considerable tendency for the seat 238 to flow in and then to follow the closure member as it is withdrawn. The radial passages 258 direct high pressure fluid outwardly to counter and compensate for the tendency of the seat to follow the closure member. A pressure balancing passage 260 leads from the lower end of closure member 250 to the upper side thereof. An intake orifice or passage 262 is formed at the lower end of pressure balancing passage 260 for regulating the flow rate to chamber 220 on the upper side of the closure member. The upper end of closure member 250 has a recessed area 264 defined by wall 266. The bottom end of said recess 264 is provided with a pilot valve seat surface 268. Opening coaxially into pilot valve seat surface 268 is pilot orifice 270 extending from the outside of the closure member generally in communication with intersecting orifice 236 and opening of course into the recess cavity 264 on the upper side of the closure member. A deflection or by-pass tube 272 is provided in this pilot valve to illustrate that the by-pass principle has application as an auxiliary portion of a structure as well as a principal portion. A seat 274 is received on the pilot valve seat surface 268 between the by-pass 272 and the outside wall of the recess area 264. The lower end of stem 252 has an inverted cup closure member 276 with recessed cavity 278 and tapered seat engaging surface 280.

An adapter member 282 in the nature of a barrel receives inverted cup portion 276 in a chamber 284 permitting limited reciprocal up-and-down movement of the closure member 276. The lower end of adapter 282 is form-fitted to engage the upper outer portion of plastic seat 274 and has ports 286 leading outwardly away from the chamber 284 to the area 288 outside said adapter member. In the pilot operated valve shown in FIGURE 5, normal flow is from bottom to top. In reverse flow the main valve will not open when it is in the closed position, and therefore, flow would be restricted through the pilot valve alone. In normal flow, from bottom 210 to top 212, and beginning with the closed position, fluid pressure enters intake orifice 262 and is conveyed by passage 260 to cavity 288. From cavity 288 the fluid communicates through ports 290 to chamber 220. The pressure in chamber 220 is controlled by opening and closing pilot valve 276. When the pilot valve is opened the pressure in chamber 220 is reduced by the flow out exhaust passage 270, through ports 236 and to orifice 212.

The higher working pressure at orifice or bore 210 causes the closure member to move up thereby closing the pilot valve. This action raises the pressure in the controlled chamber causing movement of the closure member to stop. When the pilot valve is closed the pressure in chamber 220 is at a maximum and thereby aids in closing the valve. When the pilot valve is opened, pressure in chamber 220 is at a minimum and thereby aids the valve in opening. A snap ring 292 holds the adapter 282 in place. It will be appreciated that the inverted cup and by-pass feature is versatile and may be employed in a pilot valve as well as in the main valve structure. Furthermore, this disclosure shows that the inverted cup and by-pass principle can be independent of the balance seal feature, but that at the same time each may be advantageously used with the other.

The foregoing is merely descriptive of the preferred embodiments of this invention. Since numerous modifications and equivalents may be devised by those skilled in the art it is not desired to limit the invention to the exact construction and operation shown and described. Accordingly it is intended that all suitable equivalents should fall within the scope of the invention.

What is claimed is:

1. A high pressure control valve, comprising: (a) a valve body having a generally cylindrical wall defining a central valve chamber with a seat-receiving bottom surface, and at least two orifices opening into said valve chamber, a first orifice opening generally coaxially into said valve chamber through said bottom surface and a second orifice opening into said valve chamber above said bottom surface through said valve wall; (b) a barrel member detachably received in the upper portion of the chamber, said barrel having a chamber centrally disposed therein defining a closure chamber for receiving a valve closure member; (c) a valve closure member disposed in said closure chamber for reciprocating movement therein, and including a control stem extending upwardly therefrom through said closure chamber and said barrel, the lower end of said closure member having a depending annular closure wall means with a seat-engaging surface at the lower end thereof and also having an upwardly recessed annular cavity around the inside of said closure wall, the lower end of said closure member also having a depending metering pin portion; (d) annular, generally upstanding flexible by-pass means located on said bottom surface and being surrounded on its outside diameter by a plastic seat means extending between the by-pass and valve chamber wall so that the by-pass has limited lateral movement, said by-pass means being adapted to be contacted by said metering pin portion in such a way that travel of said closure member is not obstructed by contact of said by-pass and said metering pin portion; and (e) said annular closure wall being of sufficient diameter to engage said plastic seat so that when said valve is closed said by-pass means is received in said annular cavity in such a way that said metering pin portion extends into said by-pass in its closed position, and said by-pass means is in spaced relation to the deepest part of said annular cavity.

2. A high pressure control valve, comprising: (a) a valve body having a generally cylindrical wall defining a central valve chamber with a seat-receiving bottom surface, and at least two orifices opening into said valve chamber, a first orifice opening generally coaxially into said valve chamber through said bottom surface and second orifice opening into said valve chamber above said bottom surface through said valve wall; (b) a barrel member detachably received in said chamber, said barrel having a chamber centrally disposed therein defining a closure chamber for receiving a valve closure member; (c) a valve closure member disposed in said closure chamber for reciprocating movement therein, and including a control stem extending upwardly therefrom through said closure chamber and said barrel, the lower end of said closure member having a depending annular closure wall means with a seat-engaging surface at the lower end thereof and also having an upwardly recessed annular cavity around the inside of said closure wall, the lower end of said closure member also having a depending metering pin portion; (d) annular, generally upstanding flexible by-pass means located at said bottom surface and being surrounded on its outside diameter by a plastic seat means extending between the by-pass and valve chamber wall so that the by-pass has limited lateral movement, said by-pass means being contacted by said metering pin when said closure member is in closed position in such a way that travel of said closure member is not obstructed by contact of said by-pass and said metering pin portion; and (e) said annular closure wall being of sufficient diameter to engage said plastic seat when said valve is closed so that said by-pass means is received in said annular cavity; and so that said by-pass is in spaced relation to the deepest part of said cavity whereby said plastic seat means acts as the only stop for the closure member.

3. A high pressure control valve, comprising: (a) a valve body having wall structure defining a generally round central valve chamber with a bottom surface for receiving a plastic seat; (b) a first orifice opening generally coaxially into said valve chamber through said bottom surface and a second orifice opening into said valve chamber above said bottom surface; (c) a generally cylindrical barrel member having a relatively thick wall threaded on its outside surface to be received in said valve chamber with its inner surface defining a closure chamber communicating with said valve chamber; (d) a plastic resilient seat means supported on said bottom surface with a central opening therein generally coinciding with said first orifice; (e) a seal surface formed on the inner surface of said barrel wall, said seal surface having a generally ring-shaped plastic resilient balance seal member; (f) a floating characterization ring with radially extending ports therein disposed between said balance seal and said seat member; (g) an elongated, generally round closure member received for reciprocal up-and-down movement in said closure chamber and within said ring and having a seat contacting surface on the lower portion thereof and being contacted on the upper portion thereof by said balance seal, so that the contact pressure of the closure member on said seat is transferred by said ring to said balance seal to increase the contact pressure of said balance seal on said closure member, said seat acting as the only stop to travel of said closure member.

4. A high pressure control valve, comprising: (a) a valve body having wall structure defining a generally round central valve chamber with a bottom surface for receiving a plastic seat; (b) a first orifice opening generally coaxially into said valve chamber through said bottom surface and a second orifice opening into said valve chamber above said bottom surface; (c) a generally cylindrical barrel member having a relatively thick wall threaded on its outside surface to be received in said valve chamber with its inner surface defining a closure chamber communicating with said valve chamber, said barrel member terminating above said second orifice; (d) a plastic resilient seat means supported on said bottom surface with a central opening therein coinciding with said first orifice; (e) a radially outwardly offset surface formed on the lower inner surface portion of said barrel wall, said offset surface having a generally ring-shaped plastic resilient balance seal member at the upper end thereof, the inner surface of which seal member is aligned with said inner barrel wall surface defining said closure chamber; (f) a floating cylindrical characterization ring with radially extending ports therein disposed between said balance seal and said seat member on said bottom surface, the inner surface of said ring being generally coincident with the inner surfaces of said balance seal and said barrel wall; (g) an elongated, generally round closure member received for reciprocal up-and-down movement in said closure chamber within said ring and having a seat contacting surface on the lower portion thereof and being contacted on the upper portion thereof by said balance seal, so that the contact pressure of the closure member on said seat is transferred by said ring to increase the contact pressure of said balance seal on said closure member, said seat acting as the only stop to travel of said closure member.

5. A high pressure control valve, comprising: (a) a valve body having wall structure defining a generally round central valve chamber with a bottom surface for receiving a plastic seat; (b) a first orifice opening generally coaxially into said valve chamber through said bottom surface and a second orifice opening into said valve chamber above said bottom surface; (c) a generally cylindrical barrel member having a relatively thick wall threaded on its outside surface to be received in said valve chamber with its inner surface defining a closure chamber; (d) a plastic resilient seat means supported on said bottom surface with a central opening therein coinciding with said first orifice; (e) a balance seal abutment means on the inner surface of said barrel wall, said abutment means having a generally ring-shaped plastic resilient balance seal member; (f) a floating cylindrical characterization ring with radially extending ports therein disposed between said balance seal and said seat member, the inner surface of said ring being generally coincident with the inner surface of said balance seal; (g) a valve closure member disposed in said closure chamber for reciprocating movement therein and within said ring, and including a control stem extending upwardly therefrom through said closure chamber and said barrel, the lower end of said closure member having a depending annular closure wall means with an upwardly recessed cavity defined by said annular wall; (h) annular, generally upstanding by-pass means located at said bottom surface and extending through said plastic seat means; and (i) said annular closure wall being of sufficient diameter to engage said plastic seat so that said stand pipe means is received in said cavity.

6. A high pressure control valve, comprising: (a) a valve body having wall structure defining a generally round central valve chamber with a bottom surface for receiving a plastic seat; (b) a first orifice opening generally coaxially into said valve chamber through said bottom surface and a second orifice opening into said valve chamber above said bottom surface; (c) a generally cylindrical barrel member having a relatively thick wall threaded on its outside surface to be received in said valve chamber with its inner surface defining a closure chamber; (d) a plastic resilient seat means supported on said bottom surface with a central opening therein coinciding generally with said first orifice; (e) a balance seal abutment means at the lower inner surface of said barrel wall, said abutment means having a generally ring-shaped plastic resilient balance seal member; (f) a floating cylindrical characterization ring with radially extending ports therein disposed between said balance seal and said seat member, the inner surface of said ring being generally coincident with the inner surface of said balance seal; (g) a valve closure member disposed in said closure chamber and within said ring for reciprocating movement therein, and including a control stem extending upwardly therefrom through said closure chamber and said barrel, the lower end of said closure member having depending annular closure wall means with an upwardly recessed cavity defined by said annular wall; (h) annular, generally upstanding by-pass means located on said bottom surface and positioned to direct fluid through said central opening in said plastic seat means; and (i) said annular closure wall being of sufficient diameter to engage said plastic seat so that said by-pass means is received in said cavity in spaced relation to the deepest part of said cavity when said closure member is in closed position.

7. A high pressure control valve, comprising: (a) a valve body having wall structure defining a generally round central valve chamber with a bottom surface for receiving a plastic seat; (b) a first orifice opening generally coaxially into said valve chamber through said bottom surface and a second orifice opening into said valve chamber above said bottom surface; (c) a generally cylindrical barrel member having a relatively thick wall detachably received in said valve chamber with its inner surface defining a closure chamber; (d) a plastic resilient seat means supported on said bottom surface with a central opening therein coinciding with said first orifice; (e) a seal engaging surface formed on the lower portion of said barrel wall, said seal engaging surface having a generally ring-shaped plastic resilient balance seal member, the inner surface of which is generally aligned with said inner barrel wall surface defining said closure chamber; (f) a floating characterization ring with radially extending ports therein disposed between said balance seal and said seat member, the inner surface of said ring being generally coincident with the inner surfaces of said balance seal and said barrel wall; (g) an elongated, generally round and straight sided closure member received for reciprocal up-and-down movement in said closure chamber and having a seat contacting surface on the lower portion thereof and being contacted on the upper portion thereof by said balance seal; said seat acting as the only stop to travel of said closure member.

8. A valve seat for high pressure metering valves, comprising: (a) an annular plastic resilient disc body being generally rectangular in cross section therethrough and having an interior surface, a top surface, a bottom surface and an outside surface; and (b) a generally upstanding cylindrical by-pass tube detachably secured to engage and cover the interior of said disc body, the upper end of which by-pass tube terminates above the top surface portion of said disc body which joins said interior surface, said by-pass tube having at its lower end a generally outstanding annular foot flange of lesser diameter than said disc body, said disc body having a recess in its bottom surface with the foot flange contained therein so that the bottom surface of said disc is generally coplanar with the bottom surface of said disc body.

9. A valve seat for high pressure metering valves, comprising: (a) a plastic resilient disc having a centrally disposed opening therein; and (b) the upper portion of the outside diameter of said plastic disc having an annular recess to enable said seat to receive the mating end of a characterization ring to enable said seat to be extracted from said valve by said characterization ring, the lower portion of said plastic disc being expanded so as to contact the valve's body wall and thereby eliminating need for an O-ring in connection with that portion of the barrel assembly which engages said disc.

10. A valve seat for high pressure metering valves, comprising: (a) a plastic resilient disc having a centrally disposed opening therein; (b) a metallic by-pass tube extending through said opening to define a flow orifice for said seat, said by-pass tube having an outstanding annular flange portion engaging the bottom of said disc, said flange portion being of lesser diameter than said disc; and (c) the upper portion of the outside diameter of said plastic disc having an annular recess to enable said seat to receive the mating end of a characterization port ring to allow said seat to be extracted from said valve by said characterization ring, the lower portion of said plastic disc being exposed so as to contact the valve's body wall and thereby eliminating need for a seal in connection with that portion of the barrel assembly which engages said disc.

11. A valve seat for high pressure metering valves, comprising: (a) a plastic resilient disc having a centrally disposed opening therein; (b) a metallic by-pass tube extending through said opening to define a flow orifice for said seat; and (c) the upper portion of the outside diameter of said plastic disc having an annular recess to enable said seat to receive the mating end of a characterization port ring to allow said seat to be extracted from said valve by said characterization ring.

References Cited by the Examiner

UNITED STATES PATENTS

| | | | |
|---|---|---|---|
| 96,394 | 11/1869 | Clark | 251—361 X |
| 1,872,211 | 8/1932 | Yarnall | 251—360 X |
| 2,372,392 | 3/1945 | Pletman | 251—361 X |
| 2,895,495 | 7/1959 | Bryant | 251—333 X |
| 2,927,767 | 3/1960 | Ray | 251—210 |
| 2,928,417 | 3/1960 | Buckner et al. | 251—361 X |
| 2,994,343 | 8/1961 | Banks | 137—454.5 |
| 3,010,695 | 11/1961 | Banks | 251—205 |

FOREIGN PATENTS

| | | |
|---|---|---|
| 698,384 | 11/1964 | Canada. |
| 423,921 | 11/1933 | Great Britain. |

WILLIAM F. O'DEA, *Primary Examiner.*

ISADOR WEIL, *Examiner.*

D. H. LAMBERT, *Assistant Examiner.*